(12) United States Patent
Ju et al.

(10) Patent No.: US 11,106,715 B1
(45) Date of Patent: Aug. 31, 2021

(54) SYSTEMS AND METHODS FOR USING HETEROGENEOUS GRAPHS TO DERIVE OBJECT EMBEDDINGS

(71) Applicant: Facebook, Inc., Menlo Park, CA (US)

(72) Inventors: Cheng Ju, Davis, CA (US); James Li, Pleasanton, CA (US); Bram Wasti, Redwood City, CA (US); Shengbo Guo, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 800 days.

(21) Appl. No.: 15/961,842

(22) Filed: Apr. 24, 2018

(51) Int. Cl.
*G06F 17/00* (2019.01)
*G06F 16/35* (2019.01)
*G06N 5/04* (2006.01)
*G06N 20/00* (2019.01)
*G06F 16/951* (2019.01)
*G06F 16/901* (2019.01)
*G06Q 50/00* (2012.01)

(52) U.S. Cl.
CPC .......... *G06F 16/35* (2019.01); *G06F 16/9024* (2019.01); *G06F 16/951* (2019.01); *G06N 5/046* (2013.01); *G06N 20/00* (2019.01); *G06Q 50/01* (2013.01)

(58) Field of Classification Search
CPC .... G06F 16/35; G06F 16/951; G06F 16/9024; G06N 5/046; G06N 20/00; G06N 5/022; G06N 3/08; G06N 3/0454; G06Q 50/01; H04L 29/08072; H04L 29/06; H04L 29/08135; H04L 29/08144; H04L 29/0809; H04L 29/08648
See application file for complete search history.

(56) References Cited

U.S. PATENT DOCUMENTS 7,743,058 B2 * 6/2010 Liu ..................... G06K 9/6226
707/737
8,090,754 B2 * 1/2012 Schmidt ............... G06F 16/284
707/726

(Continued)

OTHER PUBLICATIONS

Tomas Mikolov, Ilya Sutskever, Kai Chen, Greg Corrado, Jeffrey Dean; Distributed representations of words and phrases and their compositionality (Dec. 5, 2013).

(Continued)

*Primary Examiner* — Abdullahi E Salad
(74) *Attorney, Agent, or Firm* — FisherBroyles, LLP

(57) ABSTRACT

The disclosed computer-implemented method may include (1) maintaining a heterogeneous graph that represents (a) objects of a first type, (b) objects of a second type, and (c) relationships between the objects of the first type and objects of the second type, (2) using features of the objects of the first type to train a first embedding model to generate embeddings of the first type that (a) predict a label of objects of the first type and (b) predict, when combined with embeddings of the second type, graphical relationships in the graph, and (3) using features of each of the objects of the second type to train a second embedding model to generate the embeddings of the second type that predict, when combined with the embeddings of the first type, the graphical relationships in the graph. Various other methods, systems, and computer-readable media are also disclosed.

20 Claims, 10 Drawing Sheets

(56) References Cited

U.S. PATENT DOCUMENTS

| | | | | |
|---|---|---|---|---|
| 8,640,086 | B2* | 1/2014 | Bonev | G06F 9/451 717/105 |
| 10,409,828 | B2* | 9/2019 | Abdelhamid | G06F 16/9024 |
| 2007/0192350 | A1* | 8/2007 | Gao | G06K 9/6224 |
| 2007/0239677 | A1* | 10/2007 | Zhao | G06F 16/9558 |
| 2012/0143792 | A1* | 6/2012 | Wang | G06F 16/954 706/12 |

OTHER PUBLICATIONS

Thang D. Bui, Sujith Ravi, Vivek Ramavajjala; Neural Graph Machines: Learning Neural Networks Using Graphs (Mar. 14, 2017).

Sijian Tang, et al.; Systems and Methods for Using Link Graphs to Demote Links to Low-Quality Webpages; U.S. Appl. No. 15/816,121, filed Nov. 17, 2017.

Sijian Tang, et al.; Systems and Methods for Demoting Links to Low-Quality Webpages; U.S. Appl. No. 15/826,392, filed Nov. 29, 2017.

* cited by examiner

SYSTEMS AND METHODS FOR USING HETEROGENEOUS GRAPHS TO DERIVE OBJECT EMBEDDINGS

BACKGROUND

Many online systems, such as social networking systems and other social media systems, allow users to connect to and communicate with other users. Users may create profiles on an online system that are tied to their identities and that include information about the users, such as interests and demographic information. An online system may allow a user to easily communicate and to share content with other users by allowing the user to post content on the online system for presentation to the other users. Content posted on the online system by the user (i.e., user-provided content) may be declarative information provided by the user, status updates, images, photographs, videos, text data, any other information the user wishes to share with other users of the online system such as links to news stories or other external webpages, or a combination thereof. User-provided content may also include sponsored content that a sponsoring user (e.g., an advertiser) requests to be presented to other users of the online system who are not necessarily connected with the sponsoring user.

To ensure that users have a high-quality experience, many online systems maintain content policies that prohibit or control user-provided content with links to misleading, disruptive, sensational, clickbait, spammy, objectionable, offensive, suggestive, violent, illegal, unintelligible, malicious, and/or other types of low-quality domains. Unfortunately, less scrupulous users of these online systems, especially those with financial incentives, often ignore such content policies and continue to post content to the online systems that contains links to low-quality domains. For example, on some online systems, purveyors of ad-farm domains (e.g., domains that contain mostly advertisements and little quality content) are often the source of content posts or advertisements that contain links to low-quality domains. The instant disclosure, therefore, identifies and addresses a need for systems and methods that detect and manage user-provided content that contains links to ad-farm domains and other types of low-quality domains.

SUMMARY

As will be described in greater detail below, the instant disclosure describes systems and methods for using heterogeneous graphs to derive object embeddings. By simultaneously encoding label and graphical information into embedding representations of users, domains, or other online-system objects, the systems and methods disclosed herein may improve classification, analysis, and management of these objects. In one example, a computer-implemented method for using heterogeneous graphs to derive object embeddings may include (1) maintaining a heterogeneous graph that includes (a) first nodes representing objects of a first type, (b) second nodes representing objects of a second type, and (c) edges that each represents a relationship between an object of the first type and an object of the second type, (2) using features of each of the objects of the first type to train a first embedding model to generate embeddings of the objects of the first type that (a) predict a class label of a portion of the objects of the first type and (b) predict, when combined with embeddings of the objects of the second type, graphical relationships of objects represented in the heterogeneous graph, and (3) using features of each of the objects of the second type to train a second embedding model to generate the embeddings of the objects of the second type that predict, when combined with the embeddings of the objects of the first type, the graphical relationships of objects represented in the heterogeneous graph. In some examples, the first embedding model and the second embedding model may be feed-forward neural networks.

In some examples, the computer-implemented method may further include (1) using the embeddings of the objects of the first type to train a label-predicting model to predict the class label of the portion of the objects of the first type and (2) using the embeddings of the objects of the first type and the embeddings of the objects of the second type to train a graphical-relationship predicting model to predict the graphical relationships of objects represented in the heterogeneous graph. In at least one example, the first embedding model, the second embedding model, the label-predicting model, and the graphical-relationship predicting model may be trained simultaneously.

In some examples, the heterogeneous graph may be a user-domain graph, the first nodes may represent Internet domains, and the second nodes may represent users of an online system. In at least one example, each of the edges may represent one or more interactions between a user of the online system and an Internet domain. In some examples, the computer-implemented method may further include using the embeddings of the Internet domains to identify two or more Internet domains that are closely related in an embedding space of the embeddings of the Internet domains and/or using the embeddings of the users to identify two or more users that are closely related in an embedding space of the embeddings of the users. In at least one example, the computer-implemented method may further include (1) identifying user-provided content items that are candidates for a content feed of a user of the online system, (2) using (a) the embeddings of the Internet domains and/or (b) the embeddings of the users to determine a ranking of the user-provided content items, and (3) displaying the user-provided content items in the content feed of the user based in part on the ranking. In some examples, the first nodes or the second nodes may represent (1) Internet domains, (2) Internet resources, (3) users of an online system, or (3) groups of the users of the online system.

In certain examples, the step of using the features of each of the objects of the first type to train the first embedding model may include training the first embedding model to generate the embeddings of the objects of the first type to further predict an additional class label of the portion of the objects of the first type. In some examples, the heterogeneous graph may further include (1) third nodes representing objects of a third type and (2) additional edges that each represents a relationship between an object of the first type and an object of the third type. In such examples, the step of using the features of each of the objects of the first type to train the first embedding model may include training the first embedding model to generate the embeddings of the nodes of the first type to further predict, when combined with embeddings of the objects of the third type, graphical relationships of objects represented in the heterogeneous graph. In some examples, the computer-implemented method may further include using features of each of the objects of the third type to train a third embedding model to generate the embeddings of the objects of the third type that predict, when combined with the embeddings of the objects of the first type, the graphical relationships of objects represented in the heterogeneous graph.

In addition, a corresponding system for using heterogeneous graphs to derive object embeddings may include several modules stored in memory, including (1) a graph-maintaining module that maintains a heterogeneous graph that includes (a) first nodes representing objects of a first type, (b) second nodes representing objects of a second type, and (c) edges that each represents a relationship between an object of the first type and an object of the second type and (2) an embedding module that (a) uses features of each of the objects of the first type to train a first embedding model to generate embeddings of the objects of the first type that predict a class label of a portion of the objects of the first type and predict, when combined with embeddings of the objects of the second type, graphical relationships of objects represented in the heterogeneous graph and (b) uses features of each of the objects of the second type to train a second embedding model to generate the embeddings of the objects of the second type that predict, when combined with the embeddings of nodes of the first type, the graphical relationships of objects represented in the heterogeneous graph. The system may further include a physical processor configured to execute the graph-maintaining module and the embedding module.

In some examples, the system may further include a training module that (1) uses the embeddings of the objects of the first type to train a label-predicting model to predict the class label of the portion of the objects of the first type and/or (2) uses the embeddings of the objects of the first type and the embeddings of the objects of the second type to train a graphical-relationship predicting model to predict the graphical relationships of objects represented in the heterogeneous graph. In some examples, the first embedding model, the second embedding model, the label-predicting model, and the graphical-relationship predicting model may be trained simultaneously.

In some examples, the heterogeneous graph may be a user-domain graph, the first nodes may represent Internet domains, the second nodes may represent users of an online system, and each of the edges may represent one or more interactions between a user of the online system and an Internet domain. In at least one example, the system may further include a querying module that uses the embeddings of the Internet domains to identify two or more Internet domains that are closely related in an embedding space of the embeddings of the Internet domains and/or uses the embeddings of the users to identify two or more users that are closely related in an embedding space of the embeddings of the users.

In at least one example, the system may further include (1) an identifying module that identifies user-provided content items that are candidates for a content feed of a user of the online system, (2) a ranking module that uses the embeddings of the Internet domains and/or the embeddings of the users to determine a ranking of the user-provided content items, and (3) a displaying module that displays the user-provided content items in the content feed of the user based in part on the ranking.

In some examples, the above-described method may be encoded as computer-readable instructions on a computer-readable medium. For example, a computer-readable medium may include one or more computer-executable instructions that, when executed by at least one processor of a computing device, may cause the computing device to (1) maintain a heterogeneous graph that includes (a) first nodes representing objects of a first type, (b) second nodes representing objects of a second type, and (c) edges that each represents a relationship between an object of the first type and an object of the second type, (2) use features of each of the objects of the first type to train a first embedding model to generate embeddings of the objects of the first type that predict a class label of a portion of the objects of the first type and predict, when combined with embeddings of the objects of the second type, graphical relationships of objects represented in the heterogeneous graph, and (3) use features of each of the objects of the second type to train a second embedding model to generate the embeddings of the objects of the second type that predict, when combined with the embeddings of the objects of the first type, the graphical relationships of objects represented in the heterogeneous graph.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
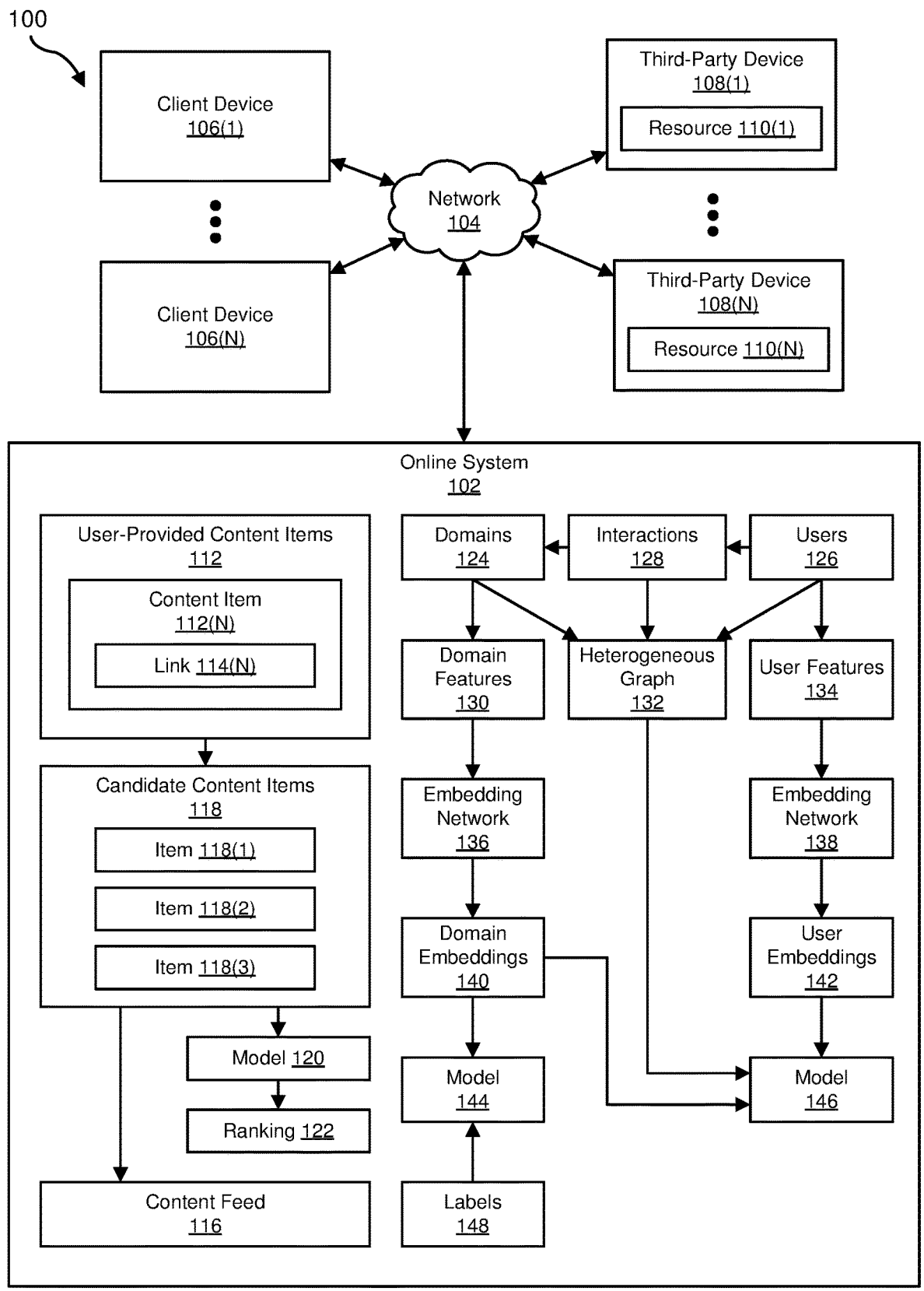
FIG. 1 is a block diagram of an exemplary system environment in which an exemplary online system operates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to graph-based semi-supervised deep learning methods and systems for encoding object features, object labels, and graphical information into object embeddings (e.g., latent vector representations of objects). As will be explained in greater detail below, the systems described herein may generate semantically meaningful embeddings that encode label information and graphical relationships of two or more different types of objects represented in a heterogeneous graph by training an embedding model to generate embeddings of one type of object to (a) predict class labels of the same type of object and/or (b) predict, when combined with embeddings of another type of object, graphical relationships of the two types of objects. In some examples, the systems and methods disclosed herein may use object embeddings that encode graphical and label information in addition to or as an alternative to raw object or raw graph features to improve classification and/or other machine-learning tasks. Since object embeddings may encode feature, label, and graphical information, objects having the same or similar embedding representations may likely have the same features, labels, or graphical relationships. If labels are not known for all objects, labels for unlabeled objects may be determined by examining the known labels of objects having the same or similar embedding representations.

In some examples, the systems described herein may generate semantically meaningful embeddings that encode label information and graphical relationships for an online system's users and the objects with which the users interact. For example, the systems described herein may generate embeddings for domains and users that encode label information indicating whether the domains are low-quality domains and graphical relationships that indicate the users' interactions with the domains. In some examples, the systems described herein may use these domain and user embeddings to train a prediction model to detect links to low-quality domains and webpages (e.g., ad-farm domains and webpages). By using the prediction model to detect when user-provided content on an online system contains links that are likely to low-quality webpages, the systems and methods disclosed herein may display the user-provided content less prominently on the online system or not at all. By displaying the user-provided content less prominently or not at all, the systems and methods disclosed herein may display, more prominently or more often, other user-provided content that contain links that are likely to higher-quality webpages and thereby improve the viewing experiences of the users of the online system. Embodiments of the instant disclosure may also provide various other advantages and features, as discussed in greater detail below.

Figure 2:
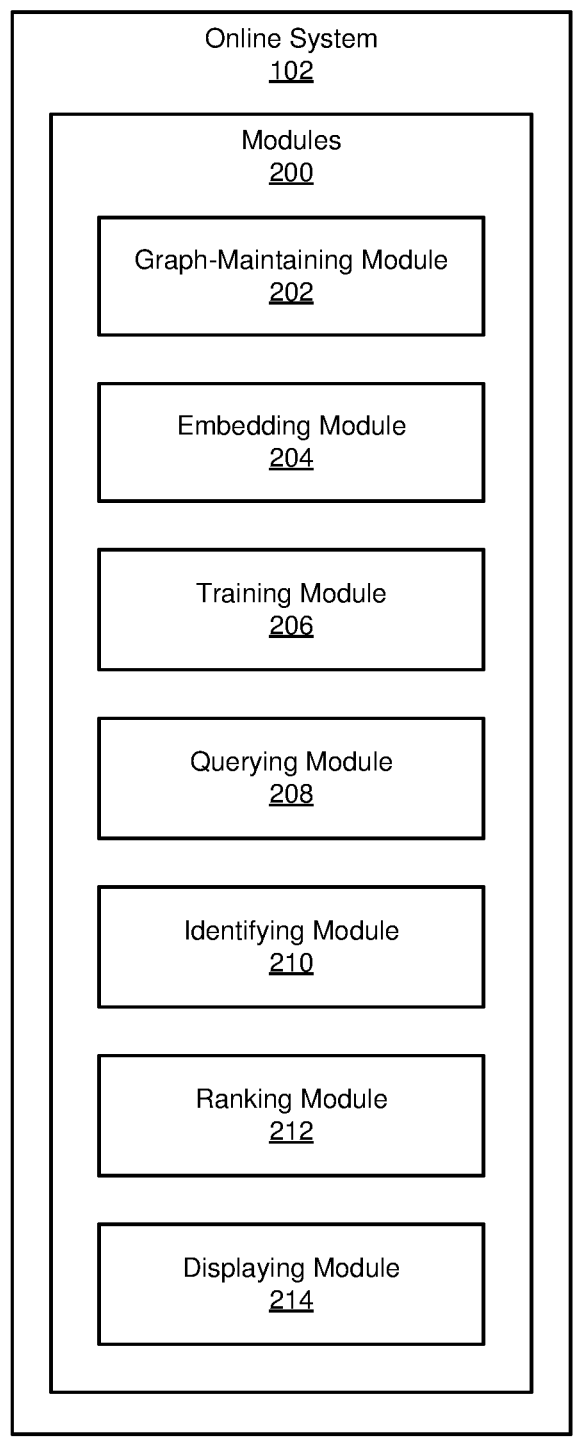
FIG. 2 is a block diagram of exemplary modules of the exemplary online system illustrated in FIG. 1.

The following will provide, with reference to FIGS. 1 and 2, detailed descriptions of an example system for generating object embeddings. Detailed descriptions of computer-implemented methods, network structures, and data flows for generating object embeddings will be provided in connection with FIGS. 3 and 6-8. Detailed descriptions of example heterogeneous graphs will be provided in connection with FIGS. 4 and 5. Also, detailed descriptions of a method for displaying user-provided content items in a content feed will be provided in connection with FIGS. 9 and 10.

FIG. 1 is a block diagram of an exemplary system environment 100 in which an online system 102 operates. As illustrated in this figure, system environment 100 may include one or more client devices 106 and one or more third-party devices 108. In this example, client devices 106(1)-(N) generally represent computing devices of the users of online system 102 that are capable of receiving user input and posting content items to online system 102 via a network 104 (e.g., the Internet). Third-party devices 108(1)-(N) generally represent computing devices or systems of one or more third-party entities that are configured to host resources 110(1)-(N) (e.g., webpages), respectively.

Online system 102 may generally represent any system that receives content items from or for its users via the Internet and stores and/or hosts these content items for its users. Examples of online system 102 include, without limitation, social-networking systems, social-media systems, photo-sharing systems, video-sharing systems, email systems, file-hosting systems, file-backup systems, news-aggregation systems, and messaging systems. As shown in FIG. 1, online system 102 may receive and/or store user-provided content items 112 from client devices 106. In some examples, each of user-provided content items 112 may include a link to a resource hosted by one of third-party devices 108. For example, content item 112(N) may contain a link 114(N) that references or points to resource 110(N) hosted by third-party device 108(N).

In some examples, the term "user-provided content item" generally means any single instance of content posted to online system 102 by a user that may be shown to other users of online system 102. In some examples, a user-provided content item may be organic social-media content (e.g., a post, a story, etc.) or any advertisement that is intended to be displayed on a social-media system with or alongside such social-media content. In some examples, a user of online system 102 may post a user-provided content item to a content feed of the user (e.g., a timeline), and other users of online system 102 may view the user-provided content item by viewing the content feed of the user. In other examples, a user of online system 102 may post a user-provided content item to a content feed of a group of users of online system 102, and each member of the group may view the user-provided content item by viewing the content feed of the group of users.

In some examples, online system 102 may compile a content feed for each user of online system 102. Online system 102 may display a variety of user-provided content items to the user via the content feed. For example, a user may follow, be friends with, or be connected to other users of online system 102, and online system 102 may compile a content feed for the user that includes content items posted by these other users. In other examples, the user may have indicated the user's interests to online system 102, and online system 102 may compile a content feed for the user that includes content items that may be related to the user's interests. In other examples, the user may have provided information about the user to online system 102, and online system 102 may compile a content feed for the user that includes content items posted by other users (e.g., an advertiser) that wish to target or communicate with the user.

In some examples, some or all of the user-provided content items that are received by online system 102 may include links to webpages or other resources that are external to online system 102 and not under the control of online system 102. When a user clicks on a link contained within a user-provided content item, the user may be redirected from online system 102 to an external webpage (i.e., the landing page of the link). In order to display user-provided content items 112 to users of online system 102, online system 102 may generate a content feed 116 that may be displayed to one or more of the users. In some examples, content feed 116 may be tailored to a single user, a group of users, or all users of online system 102. To generate content feed 116, online system 102 may select candidate content items 118 from user-provided content items 112, use a ranking model 120 to generate a ranking 122 of each of candidate content items 118, and display some or all of candidate content items 118 to users according to ranking 122. In some examples, the term "model" may refer to any machine-learning model, algorithm, heuristic, data, or combination thereof, that may be trained to make predictions, make classifications, and/or perform other machine-learning tasks. Examples of models include, without limitation, decision trees (e.g., boosting decision trees), neural networks (e.g., feed-forward, convolution, and recurrent networks), deep-learning models, support vector machines, linear classifiers, non-linear classifiers, perceptrons, naive Bayes classifiers, any other machine-learning or classification techniques or algorithms, or any combination thereof.

Online system 102 may train ranking model 120 using any suitable information and machine-learning technique. In some examples, online system 102 may train ranking model 120 using object embeddings, such as domain embeddings 140 and/or user embeddings 142. In at least one example, ranking model 120 may include embedding network 136, embedding network 138, label-predicting model 144, and/or context-predicting model 146.

As shown in FIG. 1, online system 102 may maintain information (i.e., domain features 130) about domains 124, information (i.e., user features 134) about users 126 of online system 102, and information about interactions 128 between domains 124 and users 126. Although not illustrated in FIG. 1, online system 102 may maintain information about additional objects (e.g., webpages, videos, photos, games, advertisements, groups, etc.) and how they are related to each other, domains 124, and/or users 126. Online system 102 may construct and/or maintain a heterogeneous graph 132 (e.g., user-domain graph 400 in FIG. 4 or heterogeneous graph 500 in FIG. 5) to store information about domains 124, users 126, and interactions 128.

In some examples, the term "feature" may refer to any characteristic or factor of an object that may be used to represent the object and that may be correlated with a label or graphical relationship of the object. Objects may be represented using any number of features, and each object may have a particular value (e.g., a binary or numerical value) for each of the features. In some examples, online system 102 may collect and/or derive domain features 130 by crawling each domain represented in heterogeneous graph 132, downloading its components (e.g., webpages, images, scripts, styles, etc.), and extracting features from the downloaded components. Examples of domain features 130 that may be derived in this manner include, without limitation, a number of words on a webpage, a number of links within a webpage, a languages of a text contained within a webpage, a number of common words on a webpage, a length of various portions of a text contained within a webpage, a height of a webpage, a number of images or ads on a webpage, features of a layout of a webpage, features of a URL of a webpage, and/or any other suitable features of a domain, its webpages, and/or its other content.

Online system 102 may generate user features 134 by collecting a variety of information about its users. Examples of user features 134 may include, without limitation, information about things users do on online system 102 and/or information they provide to online system 102 (e.g., demographic information, interests, etc.), information about the content and other information the users provide to online system 102 when using online system 102 (e.g., when signing up for an account, creating or sharing content, and messaging or communicating with others), information in or about the content users provide to online system 102 (e.g., the location of a photo or the date a file was created), information about how users use online system 102 (e.g., the types of content users view or engage with or the frequency and duration of users' activities), and information about content exchanged between users via online system 102).

Online system 102 may also track and store information about how users, domains, or other types of objects interact or are related. For example, online system 102 may track interactions 128 between users 126 and domains 124. Examples of interactions 128 may include, without limitation, visits to domains 124, sharing links to domains 124, liking links to domains 124, posting links to domains 124, viewing resources hosted by domains 124, and/or any other type of user/domain interaction.

Online system 102 may assign labels (e.g., labels 148) to some or all of domains 124, users 126, and/or the other objects monitored or managed by online system 102. In the example illustrated in FIG. 1, labels 148 may represent labels assigned to some of domains 124. In some examples, the term "class label" or "label" may refer to any classification that is assigned to or associated with an object (e.g., a domain, a webpage, a user-provided link, etc.) and used to distinguish some objects from other objects. In some examples, human labelers may assign one or more predefined labels to an object by examining the object and determining which of the predefined labels describe the object. For example, human labelers may assign one or more predefined labels to a domain or webpage by examining the domain or webpage and determining which of the predefined labels describe the domain or webpage.

In some examples, a label may indicate that a domain or webpage is a high-quality domain or webpage or likely not a low-quality domain or webpage by indicating a human labeler's opinion that the domain or webpage has suitable content, that the domain or webpage has high-quality content, and/or that the domain or webpage is not a low-quality domain or webpage. Additionally or alternatively, a domain or webpage may be labeled by a human labeler as an ad-farm, misleading, misinformation, disruptive, sensational, clickbait, spammy, objectionable, offensive, suggestive, violent, illegal, unintelligible, malicious, and/or other type of low-quality domain or webpage.

In some examples, a label may indicate that a domain or webpage is likely a low-quality domain or webpage by indicating a human labeler's opinion that the domain or webpage has less than a threshold level of high-quality content (e.g., less than 10 lines of text), that the domain or webpage has a disproportionate volume of advertisements relative to content (e.g., more than 50% advertisements), that the domain or webpage has sexually-suggestive content, that the domain or webpage has shocking content, that the domain or webpage has disruptive content, that the domain or webpage has malicious content, that the domain or webpage has deceptive content, that the domain or webpage has a pop-up advertisement, and/or that the domain or webpage has an interstitial advertisement.

In some examples, the systems described herein may aggregate the labels assigned to a domain's webpages to define a label for the domain. For example, the systems described herein may assign a label to a domain that indicates that its domain or webpage is a "strong ad farm" or a "weak ad farm" if a threshold number of its domains or webpages have been assigned labels that are indicative of ad-farm domains or webpages.

FIG. 2 is a block diagram of example modules of online system 102 for generating object embeddings and displaying links to low-quality webpages. As illustrated in this figure, example online system 102 may include one or more modules 200 for performing one or more tasks. As will be explained in greater detail below, modules 200 may include a graph-maintaining module 202 that maintains heterogeneous graph 132, an embedding module 204 that generates embeddings 140 and/or 142, a training module 206 that trains models 120, 144, and/or 146, a querying module 208, an identifying module 210, a ranking module 212, and a displaying module 214. Although illustrated as separate elements, one or more of modules 200 in FIG. 2 may represent portions of a single module or application.

Figure 3:
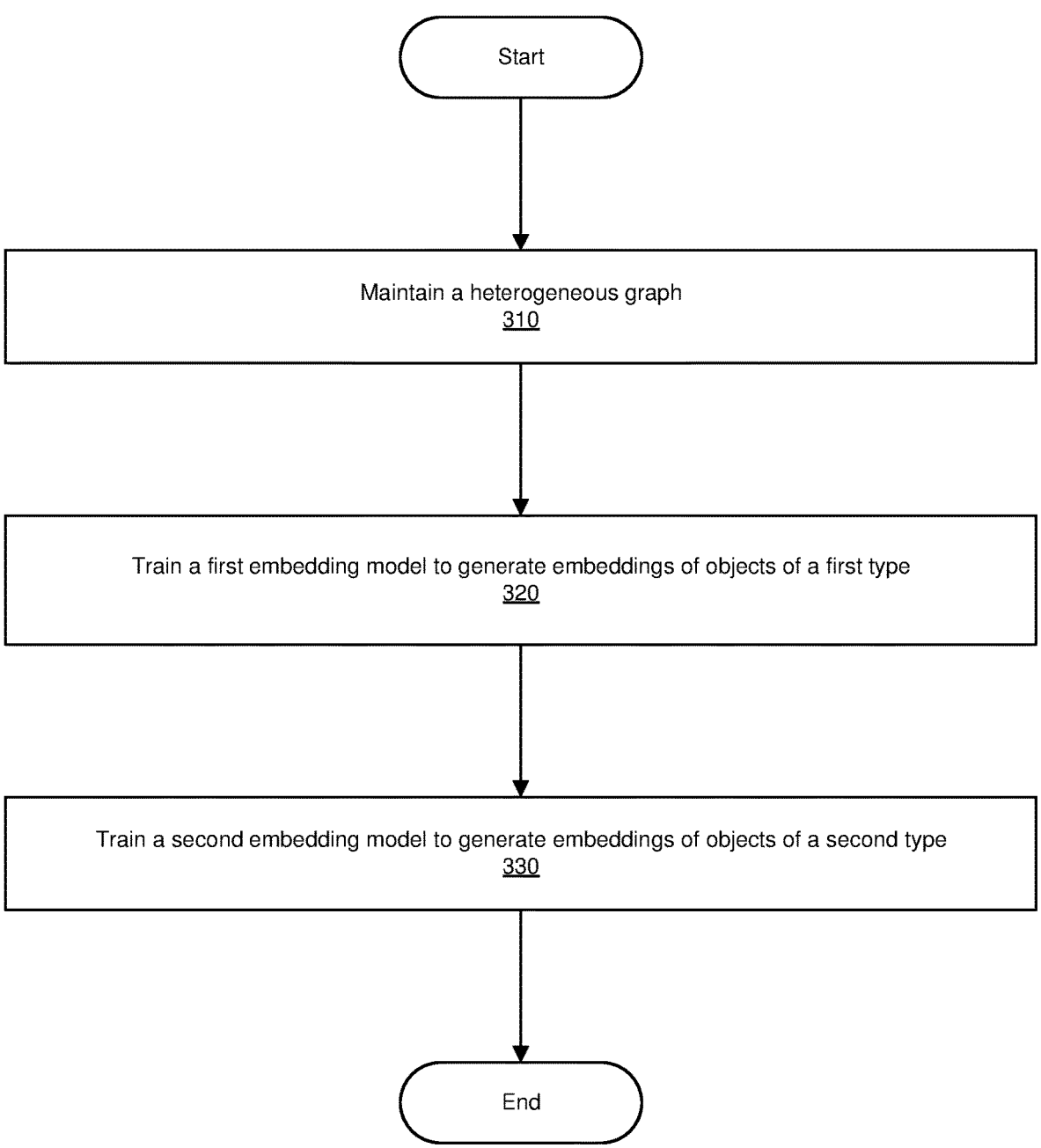
FIG. 3 is a flow diagram of an exemplary method for using heterogeneous graphs to generate embeddings for objects represented in a heterogeneous graph.

FIG. 3 is a flow diagram of an example computer-implemented method 300 for generating object embeddings using heterogeneous graphs and object labels. The steps shown in FIG. 3 may be performed by any suitable computer-executable code and/or computing system, including online system 102 in FIG. 1. In one example, each of the steps shown in FIG. 3 may represent an algorithm whose structure includes and/or is represented by multiple sub-steps, examples of which will be provided in greater detail below.

Figure 4:
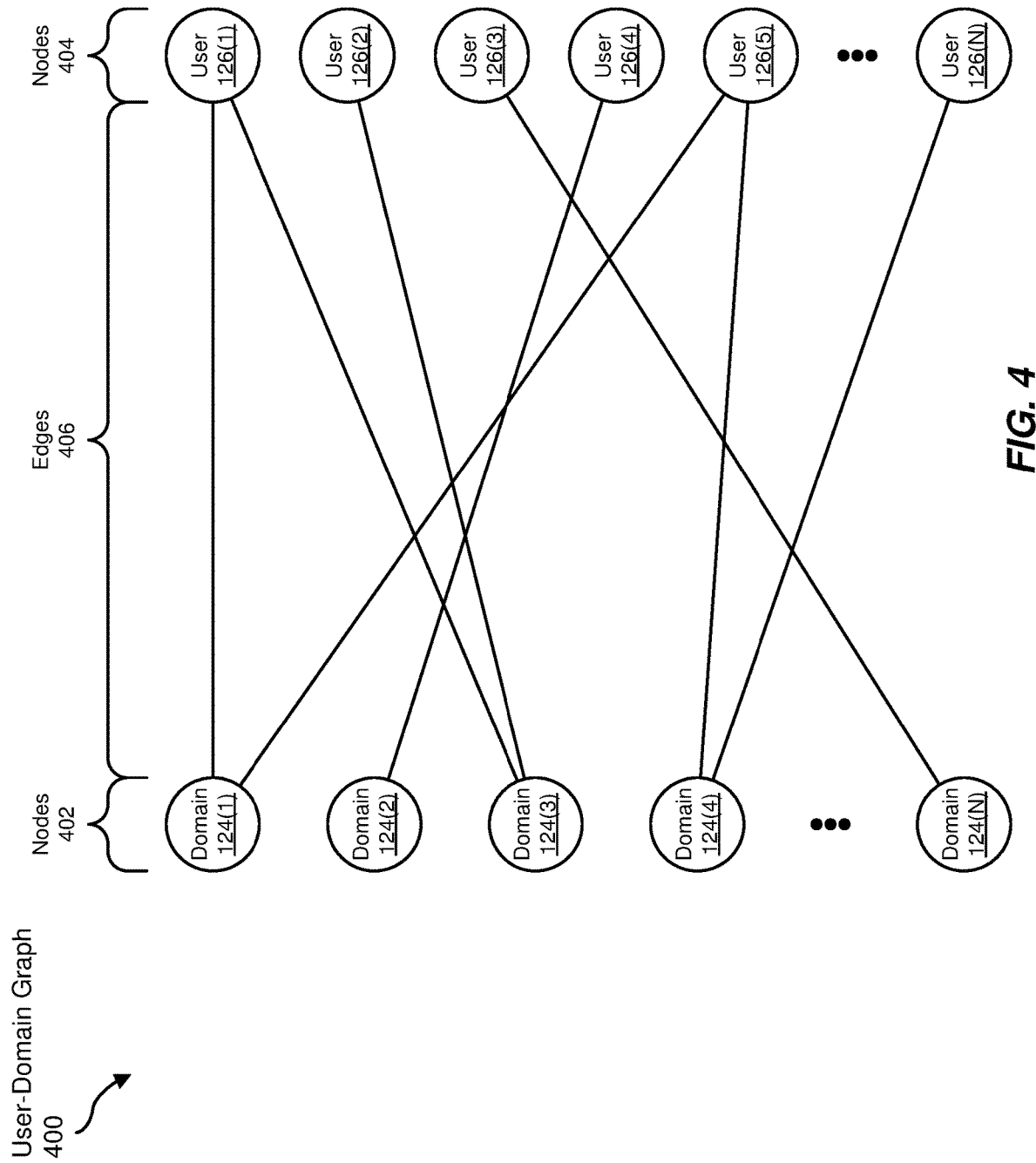
FIG. 4 is a block diagram of an exemplary heterogeneous graph.
Figure 5:
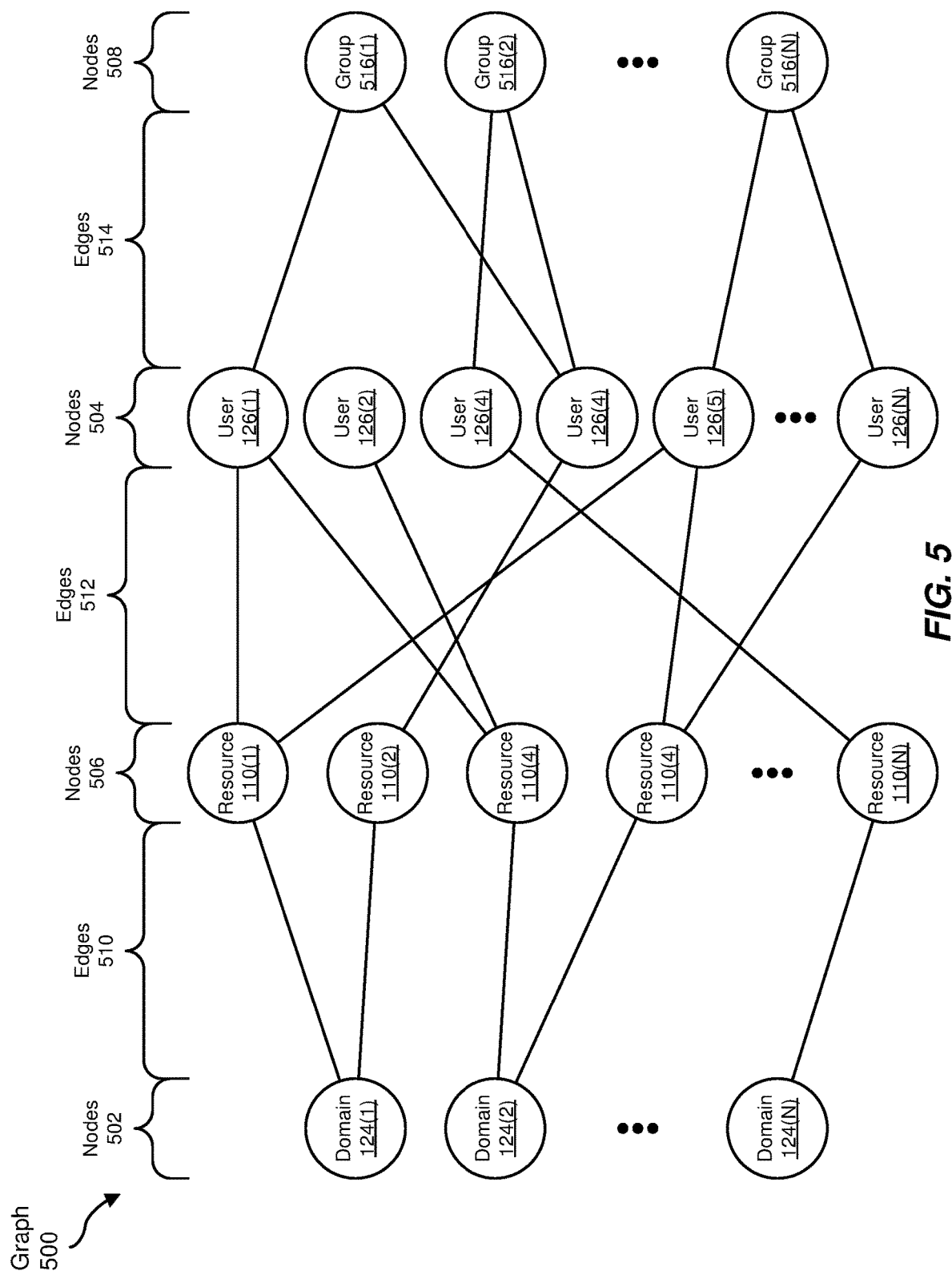
FIG. 5 is a block diagram of an additional exemplary heterogeneous graph.

As illustrated in FIG. 3, at step 310, one or more of the systems described herein may maintain a heterogeneous graph. For example, graph-maintaining module 202 may construct and/or maintain user-domain graph 400 as illustrated in FIG. 4 or heterogeneous graph 500 as illustrated in FIG. 5. In some examples, the term "heterogeneous graph" may refer to any graph that contains nodes that represent two or more different types of objects and edges that interconnect and represent relationships and/or interactions between the objects represented by the nodes in the graph.

The systems described herein may maintain a heterogeneous graph in any suitable manner. In some examples, graph-maintaining module 202 may construct a heterogeneous graph by (1) identifying two or more different types of objects, (2) tracking interactions or relationships between the identified objects, (3) representing each identified object in the heterogeneous graph as a node, and (4) using edges to link objects represented in the heterogeneous graph according to the relationships and/or interactions. In some examples, the systems described herein may use different types of edges to represent different types of interactions. In other examples, the systems described herein may weight edges based on a number of interactions between two objects (e.g., number of interactions in the last 7 days).

FIG. 4 illustrates an exemplary user-domain graph 400 that contains two types of nodes (i.e., one type of node representing domains and another type of node representing users). As shown, user-domain graph 400 includes nodes 402 each representing one of domains 124(1)-(N), nodes 404 each representing one of users 126(1)-(N), and edges 406 each interconnecting one of the nodes 402 and one of nodes 404 and representing one or more of interactions 128. While not illustrated in FIG. 4, in some examples, user-domain graph 400 may include additional edges interconnecting nodes 402 and representing relationships between domains 124(1)-(N) and/or additional edges interconnecting nodes 404 and representing relationships between users 126(1)-(N) (e.g., friendships).

In some examples, graph-maintaining module 202 may maintain user-domain graph 400 by identifying some or all registered users of online system 102 and by identifying their interactions with domains 124(1)-(N). For example, graph-maintaining module 202 may detect that user 126(1) clicked on a link to domain 124(1) and may represent this interaction by connecting the node representing user 126(1) to the node representing domain 124(1). Similarly, graph-maintaining module 202 may detect that user 126(1) also clicked on a link to domain 124(3) and may represent this interaction by connecting the node representing user 126(1) to the node representing domain 124(3).

FIG. 5 illustrates another exemplary heterogeneous graph 500 that contains four types of nodes. In this example, heterogeneous graph 500 includes nodes 502 each representing one of domains 124(1)-(N), nodes 504 each representing one of users 126(1)-(N), nodes 506 each representing a resource 110 of one of domains 124(1)-(N), and nodes 508 each representing a group 516 to which each of users 126(1)-(N) may belong. As shown, heterogeneous graph 500 may include edges 510 each interconnecting one of the nodes 502 and one of nodes 506 and representing resource ownership of domains 124(1)-(N) of resources 110(1)-(N), edges 512 each interconnecting one of the nodes 504 and one of nodes 506 and representing one or more of interactions 128, and edges 514 each interconnecting one of the nodes 504 and one of nodes 508 and representing membership of one of users(1)-(N) in one of groups 516(1)-(N). While not illustrated in FIG. 5, in some examples, heterogeneous graph 500 may include additional edges interconnecting nodes 502, nodes 504, nodes 506, and/or nodes 508.

In some examples, the systems described herein may generate a heterogeneous graph from another heterogeneous graph (e.g., by compressing a larger graph into a smaller graph). For example, graph-maintaining module 202 may generate user-domain graph 400 in FIG. 4 from heterogeneous graph 500 in FIG. 5.

At step 320, one or more of the systems described herein may train a first embedding model to generate embeddings of objects of a first type. For example, embedding module 204 may train embedding network 136 to generate domain embeddings 140. At step 330, one or more of the systems described herein may train a second embedding model to generate embeddings of objects of a second type. For example, embedding module 204 may train embedding network 138 to generate user embeddings 142.

In some examples, the term "embedding" may refer to any latent vector representation of an object that is derived during the process of training or optimizing a machine-learning model to perform a prediction or classification task. In some examples, an embedding may be a vector that represents a single object. In some examples, the term "embedding" may refer to the output of a machine-learning model that is used as input to train or optimize another machine-learning model to perform a prediction or classification task or an output of the machine-learning model after it has been so trained. In at least one example, the term "embedding" may refer to the output of a hidden or intermediate layer of a neural network. Using FIG. 6 as an example, domain embeddings 140 are shown as an output of domain embedding network 136, and user embeddings 142 are shown as an output of user embedding network 138. In this example, domain embeddings 140 may have been used to train label-predicting network 144 to make label predictions 602 of domains, and domain embeddings 140 and user embeddings 142 may have been used to train context-predicting network 146 to make context predictions 604 (e.g., predictions of distances, neighbors, edges, or other graphical relationships).

The systems disclosed herein may generate semantically meaningful embeddings for a type of object represented in a heterogeneous graph in a variety of ways. If some objects of a first type represented in a heterogeneous graph are assigned a label, the systems described herein may use features of the labeled objects and features of related objects of a second type represented in the heterogeneous graph to generate embeddings for objects of the first type that encode the label's meaning and the relationships of the objects of the first and second type by training an embedding model to generate embeddings for objects of the first type that can be used to accurately predict the labels of objects of the first type and, when combined with embeddings of objects of the second type, the relationships of objects of the first and second type. By simultaneously training a second embedding model to generate embeddings for objects of the second type that can be used to accurately predict when combined with embeddings of objects of the first type, the relationships of objects of the first and second type; the systems disclosed herein may generate embeddings for objects of the second type that also encode the label's meaning and the relationships of the objects of the first and second type.

Using FIG. 4 as an example, if some domains represented in user-domain graph 400 are assigned a label indicating that the domains are or are not low-quality domains, the systems described herein may use features of the labeled domains and features of related users that have interacted with these labeled domains to generate embeddings that encode the label's meaning and the relationships represented in user-domain graph 400 between domains and users by training an embedding model to generate domain embeddings that can be used to accurately predict the labels for the labeled domains and, when combined with user embeddings of the related users, the known interactions between the labeled domains and the related users. In this example, unlabeled domains with similar embeddings to low-quality domains may likely be low quality domains, and users with similar embeddings to users that interacted with low-quality domains may likely interact with low quality domains.

Figure 6:
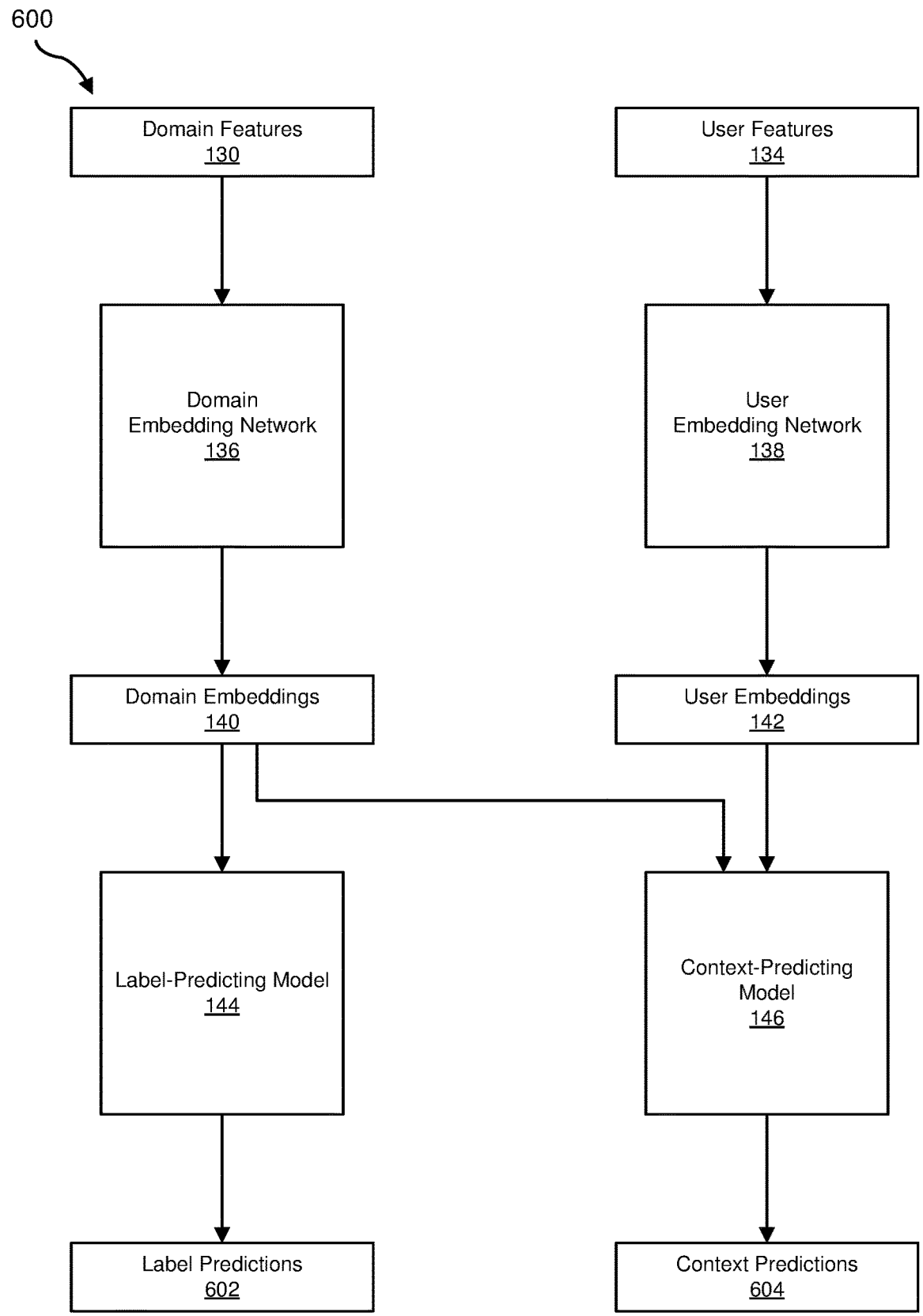
FIG. 6 is a flow diagram of an exemplary network structure and data flow for generating exemplary embedding models and exemplary predicting models.

The systems describe herein may use any suitable network structure to train embedding models. FIG. 6 illustrates an exemplary network structure 600 for training a domain embedding model and a user embedding model. In this example, domain embedding network 136 may take as input domain features 130 and may output domain embeddings 140, and user embedding network 138 may take as input user features 134 and may output user embeddings 142. In some examples, domain embedding network 136 and user embedding network 138 may be feed-forward, convolution, or recurrent neural networks and/or may not share any parameter. As shown, label-predicting model 144 may take as input domain embeddings 140 and may output label predictions 602, and context-predicting model 146 may take as input domain embeddings 140 and user embeddings 142 and may output context predictions 604.

Figure 7:
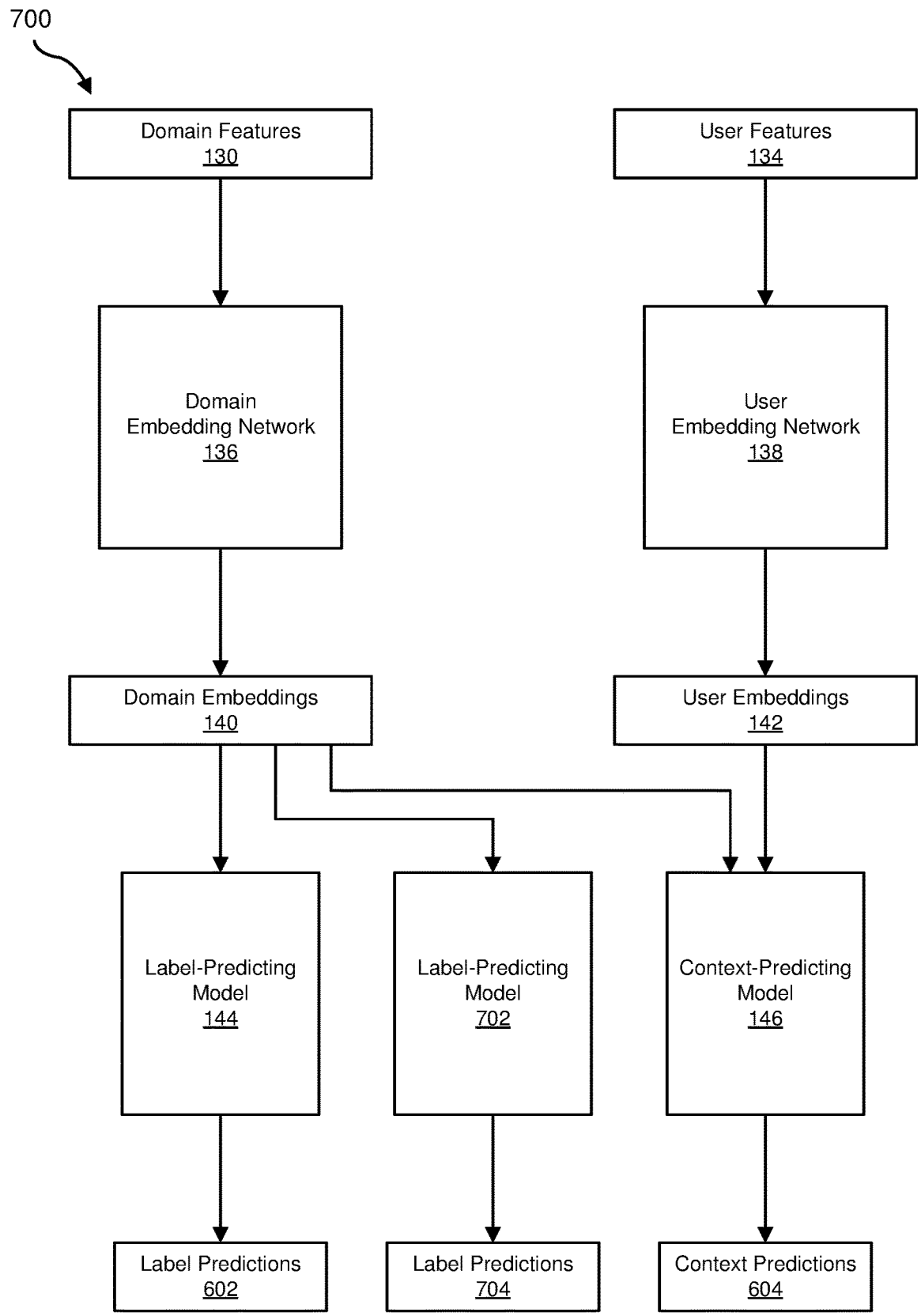
FIG. 7 is a flow diagram of an exemplary network structure and data flow for generating exemplary embedding models and exemplary predicting models.

FIG. 7 illustrates an additional exemplary network structure 700 for training a domain embedding model and a user embedding model. In this example, domain embedding network 136 may take as input domain features 130 and may output domain embeddings 140, and user embedding network 138 may take as input user features 134 and may output user embeddings 142. As shown, label-predicting model 144 may take as input domain embeddings 140 and may output label predictions 602, an additional label-predicting model 702 may also take as input domain embeddings 140 and may output label predictions 704, and context-predicting model 146 may take as input domain embeddings 140 and user embeddings 142 and may output context predictions 604. In this example, label-predicting model 144 and label-predicting model 702 may predict different types of domain labels. As such, domain embeddings 140 and user embeddings 142 may encode both labels' meanings.

Figure 8:
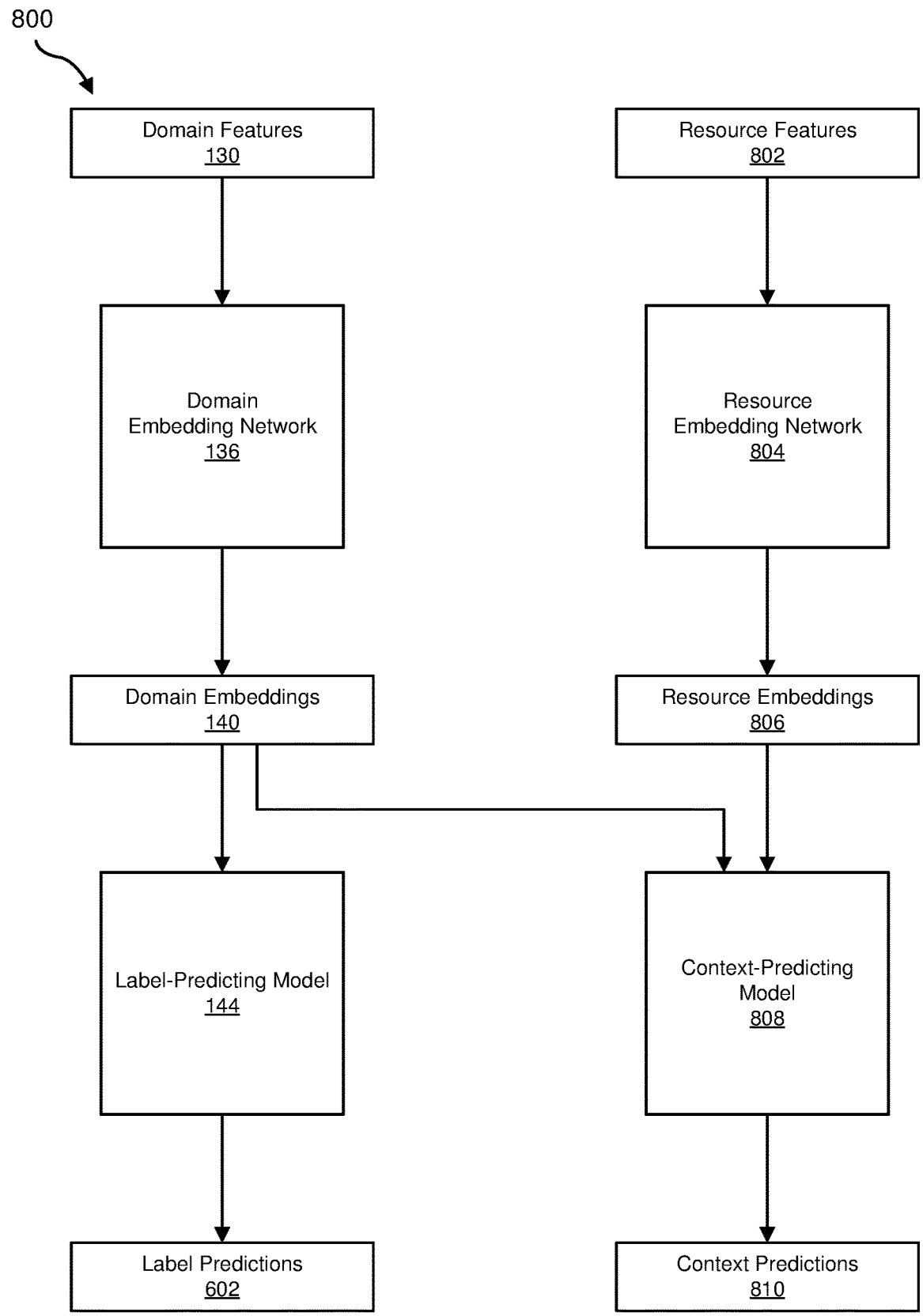
FIG. 8 is a flow diagram of an exemplary network structure and data flow for generating exemplary embedding models and exemplary predicting models.

FIG. 8 illustrates an additional exemplary network structure 800 for training a domain embedding model and a resource embedding model. In this example, domain embedding network 136 may take as input domain features 130 and may output domain embeddings 140, and resource embedding network 804 may take as input resource features 802 and may output resource embeddings 806. As shown, label-predicting model 144 may take as input domain embeddings 140 and may output label predictions 602, and context-predicting model 808 may take as input domain embeddings 140 and resource embeddings 806 and may output context predictions 810. In some examples, the systems described herein may use any combination of network structures 600, 700, and 800 to train object embedding models.

In some examples, the systems disclosed herein may simultaneously train embedding models and the predicting models that take their embeddings as input. Using FIG. 4 as an example, embedding module 204 and training module 206 may simultaneously train (e.g., using backpropagation techniques) domain embedding network 136, user embedding network 138, label-predicting model 144, and the context-predicting model 146.

The systems described herein may use any suitable objective function to train embedding modules. Using FIG. 6 as an example, embedding module 204 may train domain embedding network 136 and user embedding network 138 using the objective function $G(\theta)$, where $$G(\theta) = \sum_{j=1}^{L} L_s(f(h_d(d_j)); \theta) + \lambda \sum_{i,j} L_u\left(w_{u_i, d_j}, h_d(d_i), h_u(u_i)\right)$$

$$L_s(f(h_d(d_j))) = y_j \log(f(h_d(d_j))) + y_j \log(1 - f(h_d(d_j)))$$

$$L_u\left(w_{u_i, d_j}, h_d(d_i), h_u(u_i)\right) =$$

$$w_{u_i, d_j} d_{u_i, d_j}^2 + (1 - w_{u_i, d_j}) \cdot \max(0, m - d_{u_i, d_j})^2$$

$$d_{u_i, d_j} = \sqrt{g(concat(h_d(d_i), h_u(u_i)))}$$

In this example, $h_d$ may represent domain embedding network 136, $h_u$ may represent user embedding network 138, $d_i$ may represent one of domain features 130 (e.g., a feature vector representing the raw features of a single domain), and $u_1$ may represent one of user features 136 (e.g., a feature vector representing the raw features of a single user). As such, $h_d(d_i)$ may represent one of domain embeddings 140 (e.g., an embedding vector for a single domain), and $h_u(u_1)$ may represent one of user embeddings 142 (e.g., an embedding vector for a single user). Additionally, f may represent label-predicting model 144, and g may represent context-predicting model 146. Furthermore, $y_i$ may represent a class label of domain $d_i$, m may represent a tunable, fixed-margin parameter. In this example, a margin may indicate that unconnected input pairs that have a distance beyond this margin will not contribute to calculated losses. In some examples, $L_s$ may represent a neural-network cost (e.g., a supervised loss), and the term $L_u$ may represent a label-propagation cost (e.g., an unsupervised loss). In some examples, $h_d$ and $h_u$ may be 3-layer fully connected neural networks with output shape (96, 64, 32), f may be a 2-layer fully connected neural network with output shape (16,1), and g may be a 2-layer fully connected neural network with output shape (16,1). In some examples, w may represent weights of $h_d$, $h_u$, f, and g.

After training an embedding model to output embeddings that represent objects, the systems disclosed herein may use the embeddings to perform various machine-learning tasks. In some examples, the systems disclosed herein may use the embeddings to train additional models to perform other prediction or classification tasks. For example, as will be described below, the systems described herein may use domain embeddings and user embeddings to train a model to predict a likelihood that a user-provided link is to a low-quality webpage or domain.

In some examples, embeddings of similar or related objects may be similar and may be located near each other in an embedding space. For at least this reason, the systems described herein may use embeddings of objects to find similar or related objects. If a feature or label is known about some objects but not others, the systems described herein may query an embedding space to identify additional objects that are likely to have the same feature or label. For example, if certain users of an online system are known to routinely visit low-quality domains, the systems disclosed herein may use embeddings of the users that are known to routinely visit low-quality domains to query a user-embedding space for other users that are likely to visit low-quality domains.

In some examples, the systems described herein may display visualizations of object embeddings using a suitable dimensionality reduction technique (e.g., t-distributed Stochastic Neighbor Embedding (tSNE)). In some examples, visualized embeddings of objects may exhibit clearer separation boundaries between positive and negative samples than similarly viewed raw-feature representations of the same objects.

Figure 9:
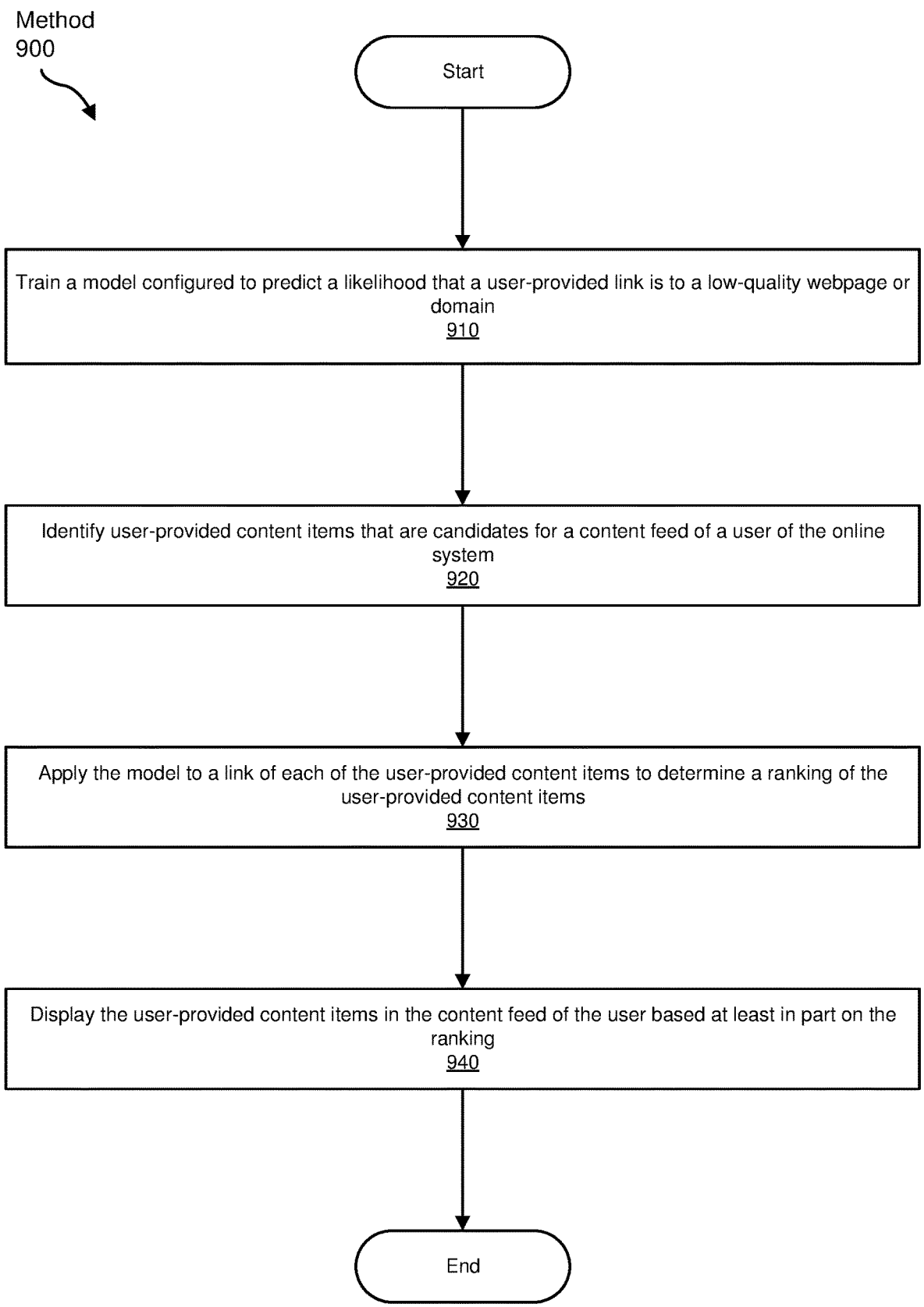
FIG. 9 is a flow diagram of an exemplary method for displaying user-provided content items in a content feed.
Figure 10:
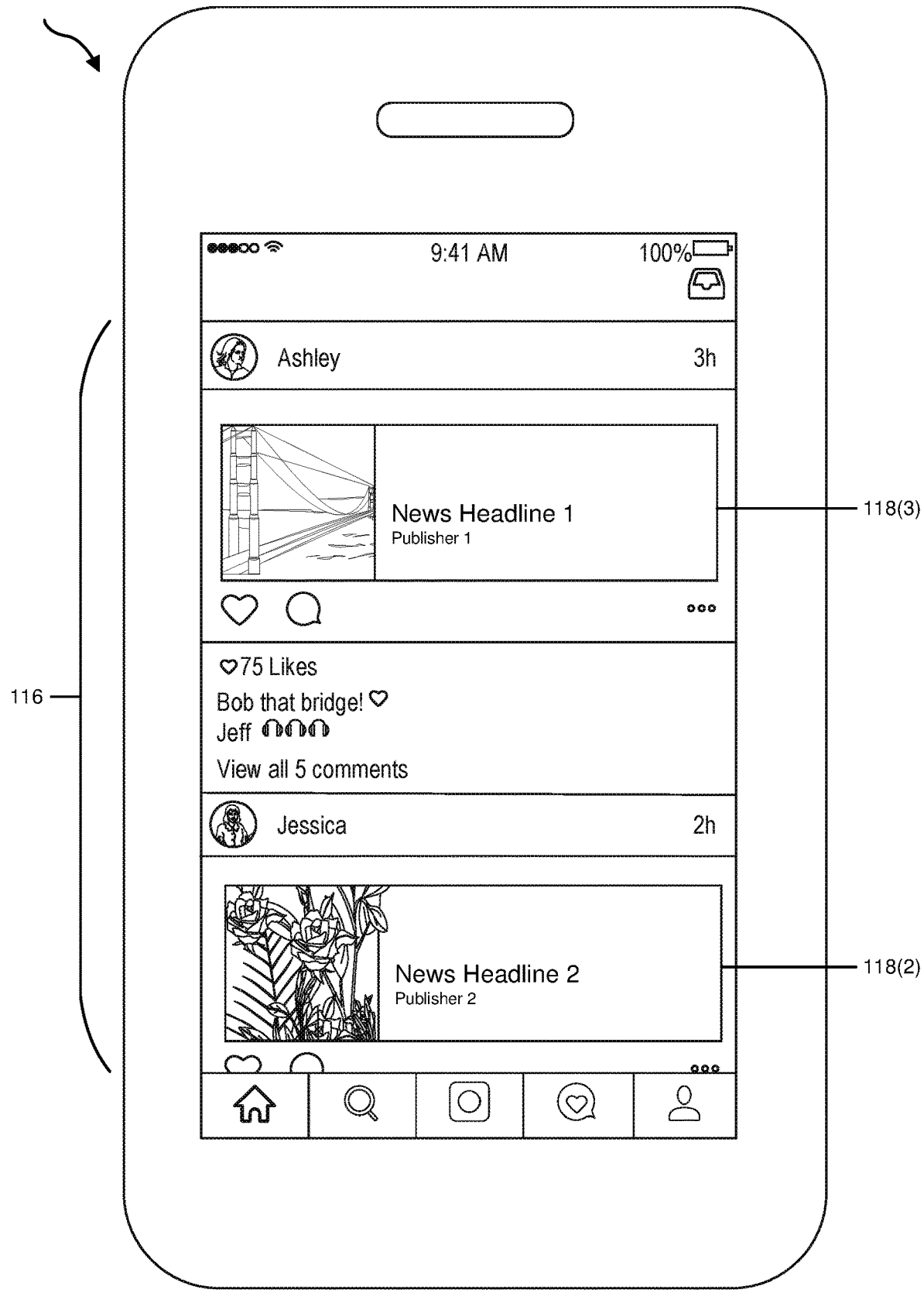
FIG. 10 is an illustration of an exemplary mobile device displaying exemplary user-provided content items in an exemplary digital content feed.

FIG. 9 is a flow diagram of an example computer-implemented method 900 for using object embeddings to demote links to low-quality webpages. The steps shown in FIG. 9 may be performed by any suitable computer-executable code and/or computing system, including online system 102 in FIG. 1. In one example, each of the steps shown in FIG. 9 may represent an algorithm whose structure includes and/or is represented by multiple sub-steps, examples of which will be provided in greater detail below.

At step 910, one or more of the systems described herein may train a model configured to predict a likelihood that a user-provided link is to a low-quality webpage or domain. Using FIG. 1 as an example, training module 206 may, as part of online system 102 in FIG. 1, train some or all of ranking model 120. In some examples, ranking model 120 may include label-predicting model 144 and/or context-predicting model 146. As such, training module 206 may train ranking model 120 by training label-predicting model 144 and/or context-predicting model 146 as described above. Once trained, a model may be capable of identify numerous types of low-quality webpages or domains, such as webpages or domains with a disproportionate volume of ads relative to content, webpages or domains with sexually suggestive or shocking content, webpages or domains with malicious or deceptive ads, and webpages or domains that use pop-up ads or interstitial ads.

At step 920, one or more of the systems described herein may identify user-provided content items that are candidates for a content feed of a user of the online system. Using FIG. 1 as an example, identifying module 210 may, as part of online system 102 in FIG. 1, identify content items 118(1)-(3) from user-provided content items 112 that are candidates for content feed 116 of a user of online system 102.

At step 930, one or more of the systems described herein may apply the model to a link of each of the user-provided content items to determine a ranking of the user-provided content items. Using FIG. 1 as an example, ranking module 212 may, as part of online system 102 in FIG. 1, generate ranking 122 by applying ranking model 120 to links contained in content items 118(1)-(3). In this example, ranking 122 may indicate the order in which content items 118(1)-(3) should be displayed in content feed 116 (e.g., content item 118(3) first, content item 118(2) second, and content item 118(1) third).

The systems described herein may rank or order candidate user-provided content items in any suitable manner. In general, the systems described herein may (1) use the model trained at step 910 to determine the likelihood that each candidate user-provided content item links to a low-quality webpage or domain and (2) rank or order the candidate user-provided content items based on these likelihoods. In some examples, the systems described herein may rank candidate user-provided content items based solely on the likelihoods that each of the candidate user-provided content items links to a low-quality webpage or domain. Alternatively, the systems described herein may rank candidate user-provided content items based on many additional factors.

In one example, the systems described herein may use an additional model to determine an initial ranking (e.g., an initial ordering) for each of the user-provided content items that are candidates for a content feed of a user based on the user's connections, interests, demographics, etc. Upon determining an initial ranking for each of the user-provided content items, the systems described herein may adjust the ranking of each of the user-provided content items based on the likelihoods that the user-provided content items link to low-quality webpages. For example, the systems described herein may demote the rankings of user-provided content items with higher likelihoods of containing links to low-quality webpages and/or may promote the rankings of user-provided content items with lower likelihoods of containing links to low-quality webpages. Using FIG. 1 as an example, ranking module 212 may, as part of online system 102, demote the ranking of content item 118(1) based on a determination that a link of content item 118(1) has a relatively high likelihood of being to a low-quality webpage and/or promote the ranking of content item 118(3) based on a determination that a link of content item 118(3) has a relatively low likelihood of being to a low-quality webpage. In some examples, the systems described herein may eliminate a user-provided content item from being a candidate for a content feed if its likelihood of containing a link to a low-quality webpage is above a predetermined threshold.

At step 940, one or more of the systems described herein may display the user-provided content items in the content feed of the user based at least in part on the ranking. Using FIG. 1 as an example, displaying module 214 may, as part of online system 102 in FIG. 1 and/or client device 106(N) in FIG. 10, display content items 118(1)-(3) to a user within content feed 116. The systems described herein may use the ranking calculated at step 930 to display user-provided content items in a variety of ways. In general, the systems described herein may display user-provided content items such that user-provided content items with links that are less likely to be to low-quality webpages are displayed more often and user-provided content items with links that are more likely to be to low-quality webpages are displayed less often. In at least one example, the systems described herein may display user-provided content items such that links that are less likely to be to low-quality webpages are clicked on more often and links that are more likely to be to low-quality webpages are clicked less often. For example, the systems described herein may warn users of user-provided content items that contain links that are more likely to be to low-quality webpages.

As explained above, the systems described herein may generate semantically meaningful embeddings that encode label information and graphical relationships of two or more different types of objects represented in a heterogeneous graph by training an embedding model to generate embeddings of one type of object to (a) predict class labels of the same type of object and/or (b) predict, when combined with embeddings of another type of object, graphical relationships of the two types of objects. In some examples, the systems and methods disclosed herein may use object embeddings that encode graphical and label information in addition to or as an alternative to raw object or raw graph features to improve classification and/or other machine-learning tasks. Since object embeddings may encode feature, label, and graphical information, objects having the same or similar embedding representations may likely have the same features, labels, or graphical relationships. If labels are not known for all objects, labels for unlabeled objects may be determined by examining the known labels of objects having the same or similar embedding representations.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a heterogeneous graph that includes nodes representing domains and nodes representing users, features of the domains, and features of the users; transform the heterogeneous graph and the features into embeddings of the domains and embeddings of the users; output a result of the transformation to perform label predictions, graphical-relationship predictions, and/or other machine-learning tasks; use the result of the transformation to predict a label or a graphical relationship of a domain or user; and store the result of the transformation for later use and/or analysis. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
maintaining a heterogeneous graph comprising:
first nodes representing objects of a first type;
second nodes representing objects of a second type; and
edges, wherein each of the edges represents a relationship between an object of the first type and an object of the second type;
using features of each of the objects of the first type to train a first embedding model to generate embeddings of the objects of the first type that:
predict a class label of at least a portion of the objects of the first type; and
predict, when combined with embeddings of the objects of the second type, graphical relationships of objects represented in the heterogeneous graph; and
using features of each of the objects of the second type to train a second embedding model to generate the embeddings of the objects of the second type that predict, when combined with the embeddings of the objects of the first type, the graphical relationships of objects represented in the heterogeneous graph.

2. The computer-implemented method of claim 1, further comprising:
using the embeddings of the objects of the first type to train a label-predicting model to predict the class label of the portion of the objects of the first type; and
using the embeddings of the objects of the first type and the embeddings of the objects of the second type to train a graphical-relationship predicting model to predict the graphical relationships of objects represented in the heterogeneous graph.

3. The computer-implemented method of claim 2, wherein the first embedding model, the second embedding model, the label-predicting model, and the graphical-relationship predicting model are trained simultaneously.

4. The computer-implemented method of claim 1, wherein:
the heterogeneous graph is a user-domain graph;
the first nodes represent Internet domains; and
the second nodes represent users of an online system.

5. The computer-implemented method of claim 4, wherein each of the edges represents one or more interactions between a user of the online system and an Internet domain.

6. The computer-implemented method of claim 4, further comprising using the embeddings of the Internet domains to identify two or more Internet domains that are closely related in an embedding space of the embeddings of the Internet domains.

7. The computer-implemented method of claim 4, further comprising using the embeddings of the users to identify two or more users that are closely related in an embedding space of the embeddings of the users.

8. The computer-implemented method of claim 4, further comprising:
identifying user-provided content items that are candidates for a content feed of a user of the online system;
using at least one of the embeddings of the Internet domains and the embeddings of the users to determine a ranking of the user-provided content items; and
displaying the user-provided content items in the content feed of the user based at least in part on the ranking.

9. The computer-implemented method of claim 1, wherein the first nodes represent one of:
Internet domains;
Internet resources;
users of an online system; or
groups of the users of the online system.

10. The computer-implemented method of claim 1, wherein the second nodes represent one of:
Internet domains;
Internet resources;
users of an online system; or
groups of the users of the online system.

11. The computer-implemented method of claim 1, wherein the first embedding model and the second embedding model are feed-forward neural networks.

12. The computer-implemented method of claim 1, wherein using the features of each of the objects of the first type to train the first embedding model comprises training the first embedding model to generate the embeddings of the objects of the first type to further predict an additional class label of at least the portion of the objects of the first type.

13. The computer-implemented method of claim 1, wherein:
the heterogeneous graph further comprises:
third nodes representing objects of a third type; and
additional edges, wherein each of the additional edges represents a relationship between an object of the first type and an object of the third type;
using the features of each of the objects of the first type to train the first embedding model further comprises training the first embedding model to generate the embeddings of the objects of the first type to further predict, when combined with embeddings of the objects of the third type, graphical relationships of objects represented in the heterogeneous graph; and
the computer-implemented method further comprises using features of each of the objects of the third type to train a third embedding model to generate the embeddings of the objects of the third type that predict, when combined with the embeddings of the objects of the first type, the graphical relationships of objects represented in the heterogeneous graph.

14. A system comprising:
a graph-maintaining module that maintains a heterogeneous graph comprising:
first nodes representing objects of a first type;
second nodes representing objects of a second type; and
edges, wherein each of the edges represents a relationship between an object of the first type and an object of the second type;
an embedding module that:
uses features of each of the objects of the first type to train a first embedding model to generate embeddings of the objects of the first type that:
predict a class label of at least a portion of the objects of the first type; and
predict, when combined with embeddings of the objects of the second type, graphical relationships of objects represented in the heterogeneous graph; and
uses features of each of the objects of the second type to train a second embedding model to generate the embeddings of the objects of the second type that predict, when combined with the embeddings of the objects of the first type, the graphical relationships of objects represented in the heterogeneous graph; and
at least one physical processor configured to execute the graph-maintaining module and the embedding module.

15. The system of claim 14, further comprising a training module that:

uses the embeddings of the objects of the first type to train a label-predicting model to predict the class label of the portion of the objects of the first type; and uses the embeddings of the objects of the first type and the embeddings of the objects of the second type to train a graphical-relationship predicting model to predict the graphical relationships of objects represented in the heterogeneous graph.

16. The system of claim 15, wherein the first embedding model, the second embedding model, the label-predicting model, and the graphical-relationship predicting model are trained simultaneously.

17. The system of claim 14, wherein:
the heterogeneous graph is a user-domain graph;
the first nodes represent Internet domains;
the second nodes represent users of an online system; and
each of the edges represents one or more interactions between a user of the online system and an Internet domain.

18. The system of claim 17, further comprising a querying module that:
uses the embeddings of the Internet domains to identify two or more Internet domains that are closely related in an embedding space of the embeddings of the Internet domains; and
uses the embeddings of the users to identify two or more users that are closely related in an embedding space of the embeddings of the users.

19. The system of claim 17, further comprising:
an identifying module that identifies user-provided content items that are candidates for a content feed of a user of the online system;
a ranking module that uses at least one of the embeddings of the Internet domains and the embeddings of the users to determine a ranking of the user-provided content items; and
a displaying module that displays the user-provided content items in the content feed of the user based at least in part on the ranking.

20. A non-transitory computer-readable medium comprising computer-readable instructions that, when executed by at least one processor of a computing device, cause the computing device to:
maintain a heterogeneous graph comprising:
first nodes representing objects of a first type;
second nodes representing objects of a second type; and
edges, wherein each of the edges represents a relationship between an object of the first type and an object of the second type;
use features of each of the objects of the first type to train a first embedding model to generate embeddings of the objects of the first type that:
predict a class label of at least a portion of the objects of the first type; and
predict, when combined with embeddings of the objects of the second type, graphical relationships of objects represented in the heterogeneous graph; and
use features of each of the objects of the second type to train a second embedding model to generate the embeddings of the objects of the second type that predict, when combined with the embeddings of the objects of the first type, the graphical relationships of objects represented in the heterogeneous graph.

* * * * *